(12) United States Patent
Zhang et al.

(10) Patent No.: US 8,099,288 B2
(45) Date of Patent: Jan. 17, 2012

(54) TEXT-DEPENDENT SPEAKER VERIFICATION

(75) Inventors: Zhengyou Zhang, Bellevue, WA (US); Amarnag Subramaya, Seattle, WA (US)

(73) Assignee: Microsoft Corp., Redmond, WA (US)

( * ) Notice: Subject to any disclaimer, the term of this patent is extended or adjusted under 35 U.S.C. 154(b) by 943 days.

(21) Appl. No.: 11/674,139

(22) Filed: Feb. 12, 2007

(65) Prior Publication Data
US 2008/0195389 A1 Aug. 14, 2008

(51) Int. Cl.
*G10L 11/00* (2006.01)
*G10L 21/00* (2006.01)
*G10L 15/00* (2006.01)

(52) U.S. Cl. ............ 704/275; 704/9; 704/250; 704/254; 704/270; 704/273

(58) Field of Classification Search .................... 704/275
See application file for complete search history.

(56) References Cited

U.S. PATENT DOCUMENTS

| | | | | |
|---|---|---|---|---|
| 5,393,236 | A * | 2/1995 | Blackmer et al. | 434/169 |
| 6,094,632 | A * | 7/2000 | Hattori | 704/239 |
| 6,233,555 | B1 | 5/2001 | Parthasarathy | |
| 6,253,179 | B1 | 6/2001 | Beigi | |
| 6,341,264 | B1 * | 1/2002 | Kuhn et al. | 704/255 |
| 6,356,868 | B1 * | 3/2002 | Yuschik et al. | 704/246 |
| 6,519,561 | B1 | 2/2003 | Farrell | |
| 6,519,563 | B1 * | 2/2003 | Lee et al. | 704/246 |
| 6,556,969 | B1 | 4/2003 | Assaleh | |
| 6,697,778 | B1 | 2/2004 | Kuhn | |
| 6,760,701 | B2 | 7/2004 | Sharma | |
| 6,772,119 | B2 | 8/2004 | Chaudhari | |
| 6,973,426 | B1 | 12/2005 | Schier | |
| 7,050,973 | B2 | 5/2006 | Aronowitz | |
| 2003/0046068 | A1 * | 3/2003 | Perronnin et al. | 704/220 |
| 2003/0046237 | A1 * | 3/2003 | Uberti | 705/44 |
| 2007/0140443 | A1 * | 6/2007 | Woodring | 379/88.06 |

OTHER PUBLICATIONS

Spirit DSP, Speaker Verification, http://www.spiritdsp.com/speaker_verification.html.
Olsson, Johan, Text dependent speaker verification with a hybrid HMM/ANN system, Thesis Project in Speech Technology, Stockholm, Nov. 2002.
Schalk, H., H. Reininger, S. Euler, A system for text dependent speaker verification field trial evaluation and simulation results, Scandinavia Eurospeech 2001.
Campbell Jr., J. P., Testing with the YOHO CS-ROM voice verification corpus, *Proceedings of ICASSP*, 1995, pp. 341-344.
Fine, S., J. Navr'atil and R. Gopinath, A hybrid GMM/SVM approach to speaker identification, *Proc of ICASSP*, 2001, vol. 1, pp. 417-420.
Freund, Y., and R. Schapire, Experiments with a new boosting algorithm, *Proc. of Thirteenth Int'l Conf. on Machine Learning*, Bari, Italy, Jul. 1996, pp. 148-156.

(Continued)

*Primary Examiner* — Justin Rider
(74) *Attorney, Agent, or Firm* — Lyon & Harr, LLP; Katrina A. Lyon

(57) ABSTRACT

A text-dependent speaker verification technique that uses a generic speaker-independent speech recognizer for robust speaker verification, and uses the acoustical model of a speaker-independent speech recognizer as a background model. Instead of using a likelihood ratio test (LRT) at the utterance level (e.g., the sentence level), which is typical of most speaker verification systems, the present text-dependent speaker verification technique uses weighted sum of likelihood ratios at the sub-unit level (word, tri-phone, or phone) as well as at the utterance level.

19 Claims, 8 Drawing Sheets

OTHER PUBLICATIONS

Gales, M., Maximum likelihood linear transformations for HMM-based speech recognition, *Computer Speech and Language*, 1998, vol. 12, No. 2, pp. 75-98.

Heck, L., and Y. Konig, Discriminative training of minimum cost speaker verification systems, *Proc. of RLA2ESCA*, Avignon, France, 1998, pp. 93-96.

Lee, C.-H., A tutorial on speaker and speech verification, *Proc. of NORSIG '98*, Vigo, Denmark, Jun. 1998, pp. 9-16.

Li, S. Z., D. Zhang, C. Ma, H. Shum, E. Chang, Learning to boost GMM based speaker verification, *Proc. of Eurospeech*, Geneva, Switzerland, Sep. 2003, pp. 1677-1680.

Moreau, N., and D. Jouvet, Use of a confidence measure based on frame level likelihood ratios for the rejection of incorrect data, *Proc. of Eurospeech*, Sep. 1999, Budapest, Hungary, vol. 1, pp. 291-294.

Nakagawa, S., and K. P. Markov, Speaker normalization using frame and utterance level likelihood normalization, *Proc. of ICASSP*, 1997, pp. 1087-1090.

Reynolds, D. A., T. F. Quatieri, and R. B. Dunn, Speaker verification using adapted Gaussian mixture models, *Digital Signal Processing*, Academic Press, 2000, vol. 10, No. 1-3.

Rosenberg, A. E., J. Delong, C.-H. Lee, B.-H. Juang, and F. K. Soong, The use of cohort normalized scores for speaker recognition, *Proc. ICSLP*, Oct. 1992, pp. 599-602.

Rosenberg, A., S. Siohan, and S. Parthasarathy, Speaker verification using minimum verification error training, *Proc. of ICASSP '98*, pp. 105-108.

Sukkar, R., C.-H. Lee, Vocabulary independent discriminative utterance verification for non-keyword in sub-word based speech recognition, *IEEE Trans. Speech and Audio Processing*, 1996, vol. 4, No. 6, pp. 420-429.

Yu, K., J. Mason, and J. Oglesby, Speaker recognitions using hidden Markov models, *IEEE Vision Image and Signal Processing*, Apr. 1994, vol. 142, No. 2, pp. 291-298.

Zilca, R. D., Text-independent speaker verification using utterance level scoring and covariance modeling, *IEEE Transactions on Speech and Audio Processing*, Sep. 2002, vol. 10, No. 6, pp. 363-370.

* cited by examiner

TEXT-DEPENDENT SPEAKER VERIFICATION

BACKGROUND

Speaker recognition is the process of automatically recognizing who is speaking on the basis of individual information included in speech signals. It can be divided into speaker identification and speaker verification. Speaker identification determines which registered speaker provides a given utterance from amongst a set of known speakers. Speaker verification accepts or rejects the identity claim of a speaker to determine if they are who they say they are. Speaker verification can be used to control access to restricted services, for example, phone access to banking, database services, shopping or voice mail, and access to secure equipment.

Speaker verification systems typically use voice biometrics to verify that a given speaker is who they say they are. Voice biometrics is used by digitizing a profile of a person's speech to produce a stored model voice print, or template. Biometric technology typically reduces each spoken word to segments composed of several dominant frequencies called formants. Each segment has several tones that can be captured in a digital format. The tones collectively identify the speaker's unique voice print. Voice prints are stored in databases in a manner similar to the storing of fingerprints or other biometric data.

In both speaker identification and speaker verification, an enrollment session is often required for the system to collect speaker-specific training data to build speaker models. Enrollment is the procedure of obtaining a voice sample. To ensure a good-quality voice sample for speaker verification, a person usually recites some sort of text or pass phrase, which can be either a verbal phrase or a series of numbers. The text or phrase may be repeated several times before the sample is analyzed and accepted as a template or model in the database. When a person speaks the assigned pass phrase, voice features are extracted and compared with the stored template or model for that individual. When a user attempts to gain access to the system, his or her pass phrase is compared with the previously stored voice model.

Voice verification systems can be text dependent, text independent, or a combination of the two. Text dependent systems require a person to speak a predetermined word or phrase. This information, known as a "pass phrase," can be a piece of information such as a name, birth city, favorite color or a sequence of numbers. Text independent systems recognize a speaker without requiring a predefined pass phrase. Text independent systems typically operate on speech inputs of longer duration so that there is a greater opportunity to identify distinctive vocal characteristics (i.e., pitch, cadence, tone).

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The present text-dependent speaker verification technique makes use of generative models to learn the characteristics of a speaker and then discriminative models to discriminate between a speaker and an impostor. One of the advantages of the present technique is that it does not require retraining of the generative model to learn the characteristics of a specific speaker. The typical speech recognizer is an example of a generative model. In practice, training a speech recognizer is computationally very expensive. The present technique leverages an already trained speech recognizer, thus largely eliminating the burden of collecting a large amount of data specifically for speaker verification.

In one embodiment, the present text-dependent speaker verification technique uses a generic speaker-independent speech recognizer for robust speaker verification. In particular, the acoustic model of a speaker-independent speech recognizer is used as the universal background model (i.e. a model for all the imposters). Instead of using a likelihood ratio test (LRT) at the utterance level (e.g., the sentence level), which is typical of most speaker verification systems, the present text-dependent speaker verification technique also uses weighted sum of likelihood ratios at the sub-unit level (word, tri-phone, or phone). These weights can either be automatically learned or manually set to give more weight to sub-units that are more useful in determining whether a speaker is an imposter or not during the verification process.

It is noted that while the limitations in existing speaker verification schemes, such as the requirement to collect a huge amount of data to train a speech recognizer, can be resolved by a particular implementation of the present text-dependent speaker verification technique, this is in no way limited to implementations that just solve this noted disadvantage. Rather, the present technique has a much wider application as will become evident from the descriptions to follow.

In the following description of embodiments of the present disclosure reference is made to the accompanying drawings which form a part hereof, and in which are shown, by way of illustration, specific embodiments in which the technique may be practiced. It is understood that other embodiments may be utilized and structural changes may be made without departing from the scope of the present disclosure.

DESCRIPTION OF THE DRAWINGS

The specific features, aspects, and advantages of the disclosure will become better understood with regard to the following description, appended claims, and accompanying drawings where:

DETAILED DESCRIPTION

1.0 The Computing Environment

Before providing a description of embodiments of the present text-dependent speaker verification technique, a brief, general description of a suitable computing environment in which portions thereof may be implemented will be described. The present technique is operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1:
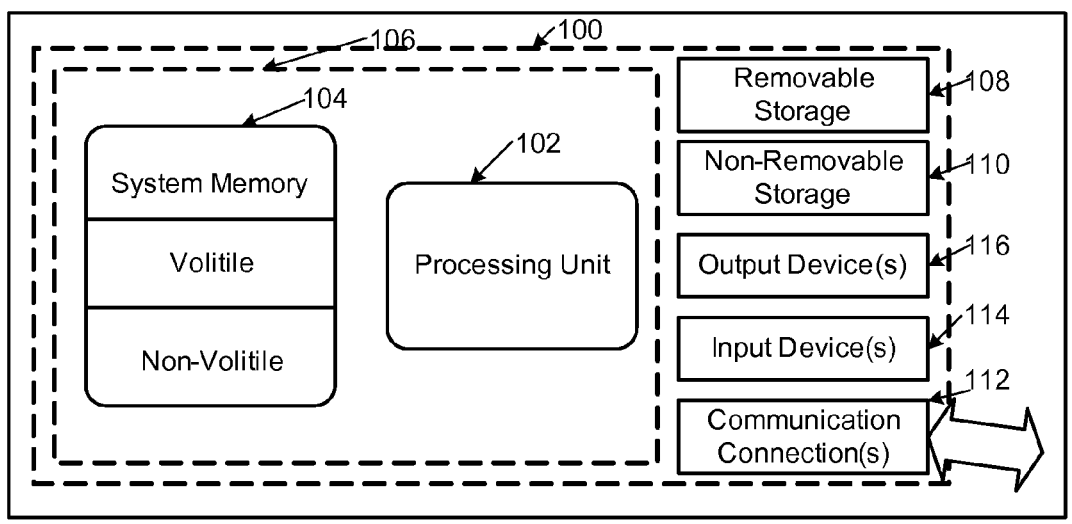
FIG. 1 is a diagram depicting a general purpose computing device constituting an exemplary system for a implementing a component of the present text-dependent speaker verification technique.

FIG. 1 illustrates an example of a suitable computing system environment. The computing system environment is only one example of a suitable computing environment and is not intended to suggest any limitation as to the scope of use or functionality of the present text-dependent speaker verification technique. Neither should the computing environment be interpreted as having any dependency or requirement relating to any one or combination of components illustrated in the exemplary operating environment. With reference to FIG. 1, an exemplary system for implementing the present text-dependent speaker verification technique includes a computing device, such as computing device 100. In its most basic configuration, computing device 100 typically includes at least one processing unit 102 and memory 104. Depending on the exact configuration and type of computing device, memory 104 may be volatile (such as RAM), non-volatile (such as ROM, flash memory, etc.) or some combination of the two. This most basic configuration is illustrated in FIG. 1 by dashed line 106. Additionally, device 100 may also have additional features/functionality. For example, device 100 may also include additional storage (removable and/or non-removable) including, but not limited to, magnetic or optical disks or tape. Such additional storage is illustrated in FIG. 1 by removable storage 108 and non-removable storage 110. Computer storage media includes volatile and nonvolatile, removable and non-removable media implemented in any method or technology for storage of information such as computer readable instructions, data structures, program modules or other data. Memory 104, removable storage 108 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 100. Any such computer storage media may be part of device 100.

Device 100 may also contain communications connection(s) 112 that allow the device to communicate with other devices. Communications connection(s) 112 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Device 100 has a microphone and may also have other input device(s) 114 such as keyboard, mouse, pen, voice input device, touch input device, and so on. Output device(s) 116 such as a display, speakers, a printer, and so on may also be included. All of these devices are well known in the art and need not be discussed at length here.

Device 100 can include a camera as an input device 114 (such as a digital/electronic still or video camera, or film/photographic scanner), which is capable of capturing a sequence of images, as an input device. Further, multiple cameras could be included as input devices. The images from the one or more cameras can be input into the device 100 via an appropriate interface (not shown). However, it is noted that image data can also be input into the device 100 from any computer-readable media as well, without requiring the use of a camera.

The present text-dependent speaker verification technique may be described in the general context of computer-executable instructions, such as program modules, being executed by a computing device. Generally, program modules include routines, programs, objects, components, data structures, and so on, that perform particular tasks or implement particular abstract data types. The present text-dependent speaker verification technique may also be practiced in distributed computing environments where tasks are performed by remote processing devices that are linked through a communications network. In a distributed computing environment, program modules may be located in both local and remote computer storage media including memory storage devices.

The exemplary operating environment having now been discussed, the remaining parts of this description section will be devoted to a description of the program modules embodying the present text-dependent speaker verification technique.

2.0 Text-Dependent Speaker Verification Technique

The following paragraphs provide descriptions of exemplary architectures and processes employing the present text-dependent speaker verification technique, and details regarding various embodiments.

2.1 Hidden Markov Models

Generally, most speech recognition systems are based on generative models of acoustics employing hidden Markov models (HMMs) that typically use a number of Gaussian mixture models to generate sequences of acoustic vectors. More specifically, in the case of speaker verification, the standard practice is to generate speaker models using Gaussian Mixture Models (GMMs) (which can be considered a subset of HMMs) that represent the distribution of a speaker's speech feature vectors as a mixture of many Gaussians, and by doing so pool the frames of speech into a single "generic-speech" model. For such a system, a Universal Background Model (UBM) is typically used to model generic non-speaker-specific speech. In other words, UBM is a model that potentially represents everyone in this universe. A natural alternative to GMMs that captures sequential information and thus produces more tightly focused speech states is to use Hidden Markov Models (HMMs) for speaker modeling.

In a statistical framework, an inventory of elementary probabilistic models of basic linguistic units (for example, phonemes) is used to build word representations. A sequence of acoustic parameters, extracted from a spoken utterance, is seen as a realization of a concatenation of elementary processes described by hidden Markov models (HMMs). An HMM is a composition of two stochastic processes, a hidden Markov chain, which accounts for temporal variability, and an observable process, which accounts for spectral variability. This combination is powerful enough to cope with the most important sources of speech ambiguity, and flexible enough to allow for the creation of recognition systems with dictionaries of tens of thousands of words.

A hidden Markov model is defined as a pair of stochastic processes (X,Y). The X process is a first order Markov chain, and is not directly observable, while the Y process is a sequence of random variables taking values in the space of acoustic parameters, or observations. Two formal assumptions characterize HMMs as used in speech recognition. The first-order Markov hypothesis states that history has no influence on the chain's future evolution if the present is specified, and the output independence hypothesis states that neither chain evolution nor past observations influence the present observation if the present value of X is known.

HMMs are mainly used to model the acoustic units to be recognized. In HMM-based speaker verification, models for both background noise and speech are required. To create the Background Model, a Universal Background Model (UBM) is typically trained by using speech data from a large collection of impostor speakers. For a given system, the UBM is typically fixed and care is taken to ensure that target speakers are excluded from its training data. To model a speaker, S, the model parameters (generally the Gaussian means) are adapted to the speaker's training data. The actual verification is then performed using the combination of these models.

2.2 Typical Speech Verification System

Figure 2:
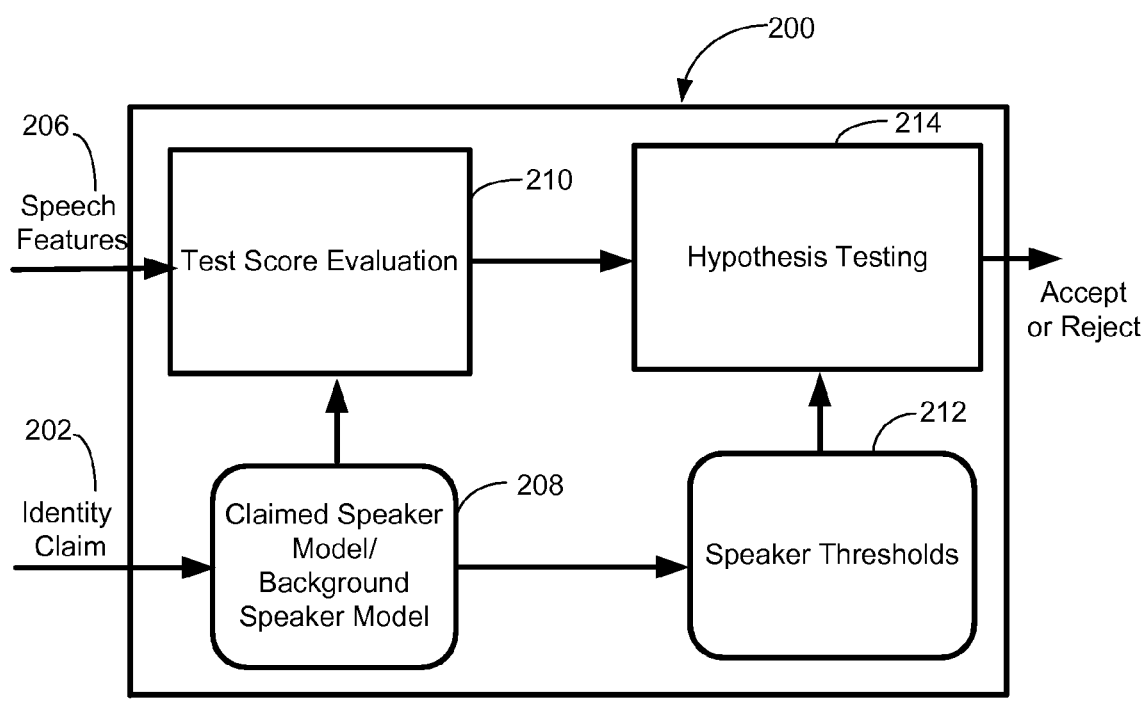
FIG. 2 is a block diagram an exemplary speaker verification system.

FIG. 2 shows a typical speaker verification system. A typical speaker verification system employs a trained speech recognizer 200 that uses features 206 of an input speech signal and an identity claim 202 to determine if the input speech signal is a given speaker that is speaking a particular pass phrase. This is typically done by comparing the input speech signal/identity claim 202 to the speaker specific model (model of the claimed speaker) and the background speaker models (model not of a given speaker, or model of the impostors) 208 using the features 206. The claimed speaker model and background speaker model 208 are created from a set of training samples. Given a sequence of speech feature vectors 206, and the claimed identity of a speaker 202, a test score 210 is computed by the speech recognizer 200 based on the corresponding speaker models 208. The score 210 is then compared to one or more thresholds 212 associated with the claimed speaker to decide if the claimed identity should be accepted or rejected using hypothesis testing 214. A system can then either accept the assertion that the speech belongs to the target speaker, or reject it and declare the utterance was generated by an impostor.

2.3 Text-Dependent Speaker Verification System.

Figure 3:
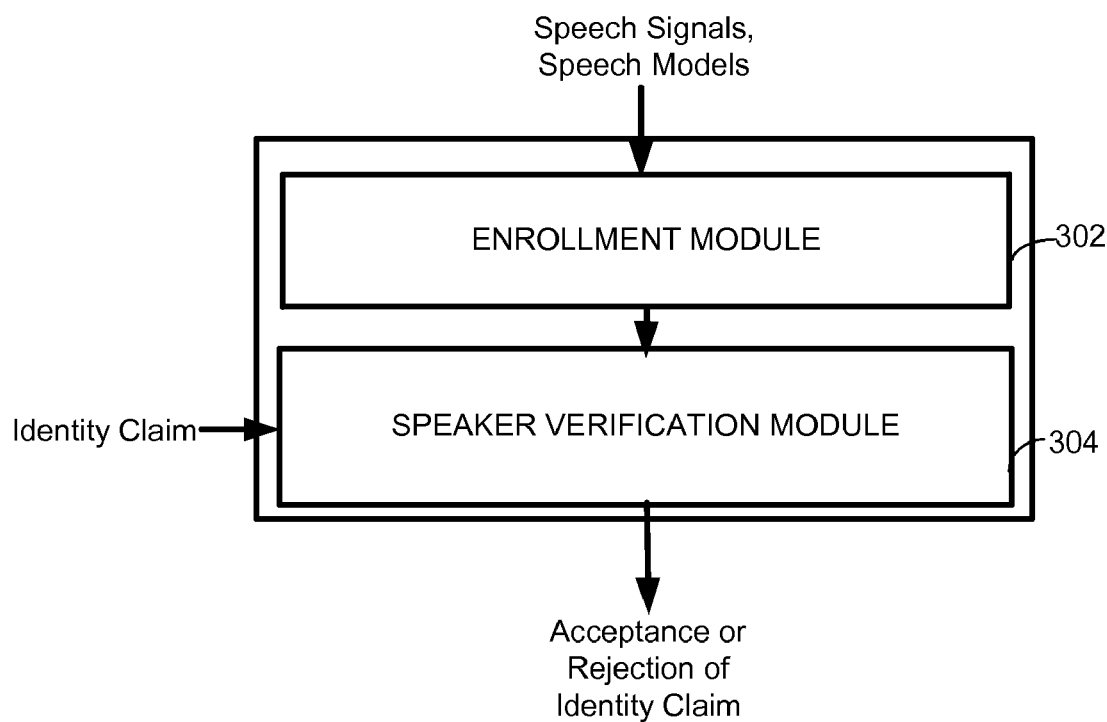
FIG. 3 is a block diagram depicting one embodiment of the architecture of the present text-dependent speaker verification technique.

The present text-dependent speaker verification technique makes use of a hybrid generative-discriminative framework. One embodiment of the present text-dependent speaker verification architecture 300 is shown in FIG. 3. The architecture generally involves an enrollment module 302 and a verification module 304.

Figure 4:
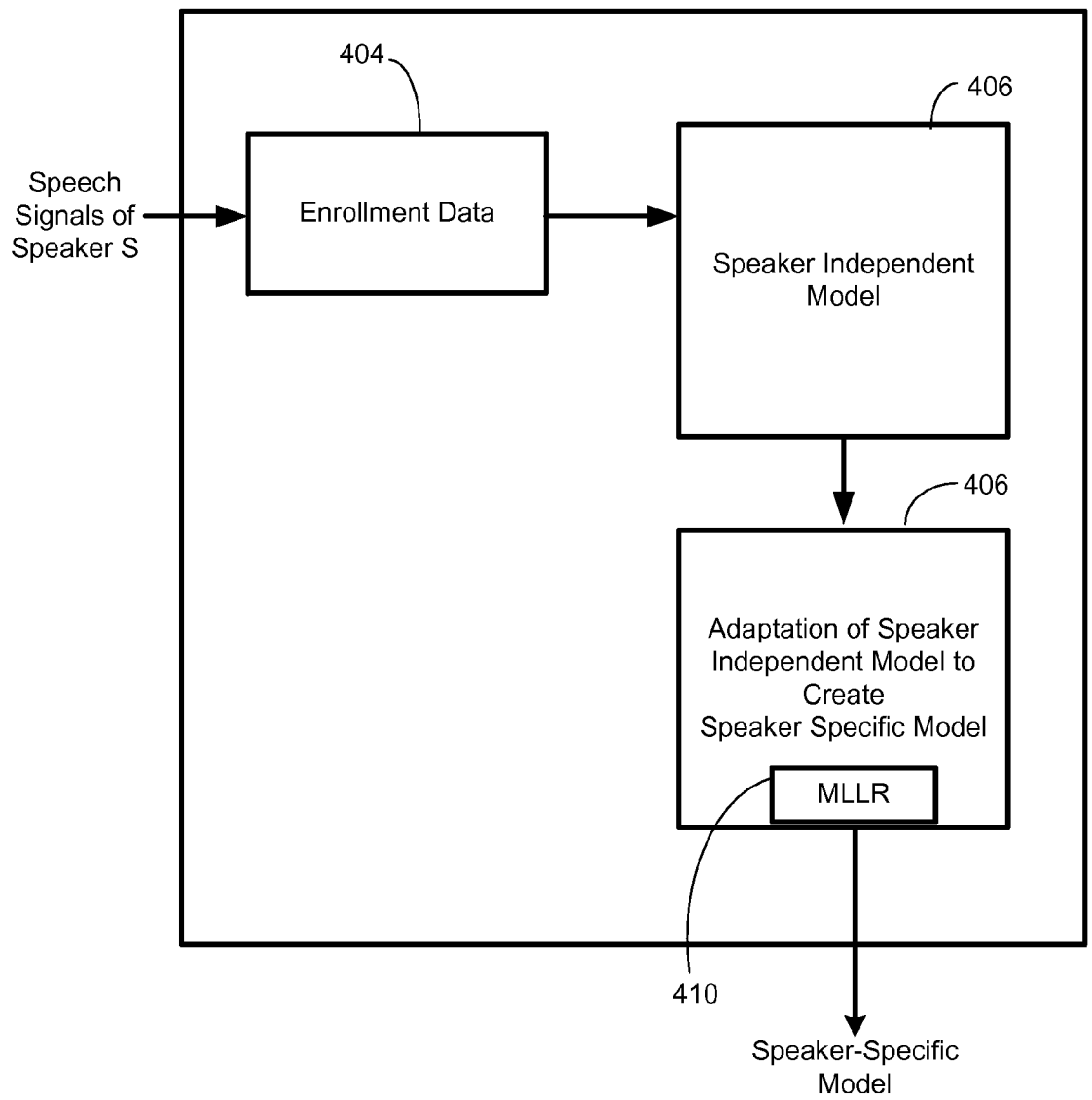
FIG. 4 is a flow diagram depicting one exemplary embodiment of the enrollment process of the present text-dependent speaker verification technique.

The enrollment module 302 of the present text-dependent speaker verification technique is shown in more detail in FIG. 4. In general, during enrollment, the system parameters are adjusted to better model the speaker (user). The enrollment module includes enrollment data 404 for Speaker S. A user S is first asked to repeat his or her password n times. These enrollment data 404 are then used to adapt the speaker independent model 406 ($\Lambda$) to yield speaker specific models ($\Lambda^s$) 408 for speaker S. In one embodiment this is done by using maximum likelihood linear regression (MLLR) via a MLLR module 410. The basic form of the equation in MLLR is $\Lambda^s = A^*\Lambda + b$. It can be shown that the matrix A causes a rotation in the model space, and adding b results in a translation. While it is possible to break the model space into mutually exclusive regions, and estimate a different rotation and translation for each region, the present text-dependent speaker verification technique chooses not to do so as the amount of adaptation data is limited. Thus, the present text-dependent speaker verification technique makes use of global adaptation, i.e., a single rotation (A) and translation (b) is estimated for all the means in the recognizer. Once speaker enrollment is complete, speaker specific models are available for speaker S.

Figure 5:
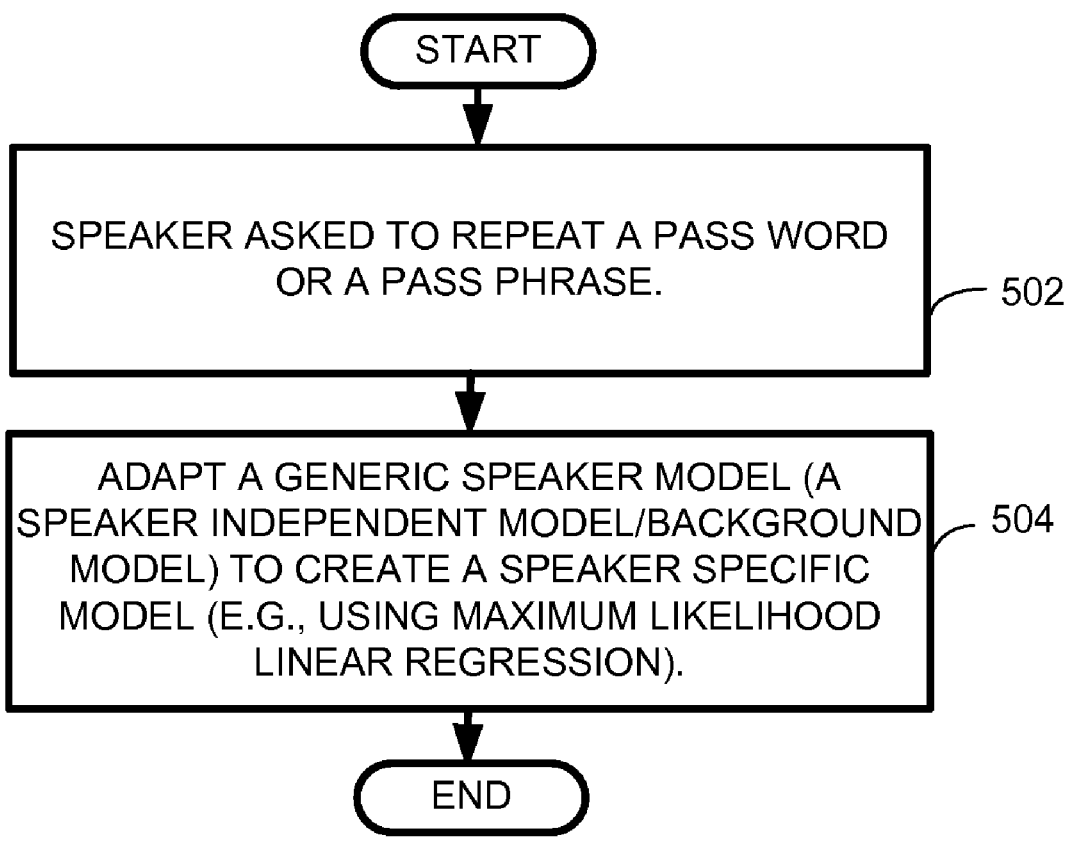
FIG. 5 is a flow diagram depicting one embodiment of a process employed for speaker enrollment employed in one embodiment of the present text-dependent verification technique.

One embodiment of a process employed for speaker enrollment in the present text-dependent verification technique is shown in FIG. 5. As shown in block 502, a speaker is asked to repeat a password or pass phrase. Then a generic speaker model (a speaker independent model/background model) is adapted to create a speaker-specific model, as shown in block 504. In one embodiment, the generic speaker model is adapted using a Maximum Likelihood Linear Regression procedure. The speaker-specific model can then later be used in the speaker verification process.

Figure 6:
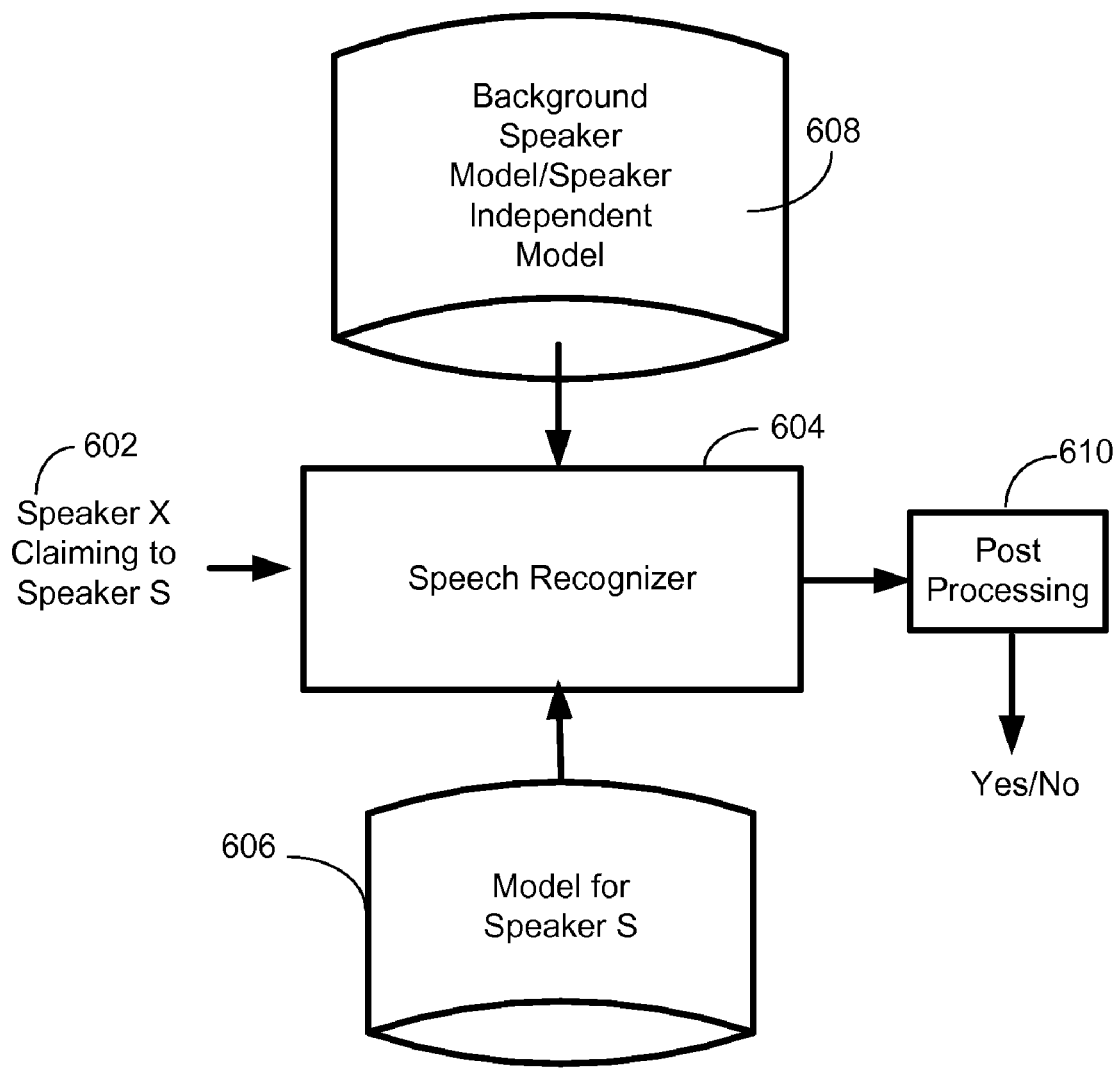
FIG. 6 is a block diagram depicting one exemplary embodiment of the architecture of the present text-dependent speaker verification technique.

Details of the verification module 304 are shown in FIG. 6. A speech signal 602 of Speaker X claiming to be Speaker S is input into a Speech Recognizer 604. The specific model for Speaker S 606 and a Background Speaker Model/Speaker-independent model 608 are also input into the Recognizer 604. (In one working embodiment, the standard telephony engine created by Microsoft Corporation was used as the generative model). The speech recognizer takes as input an utterance spoken by the user and a model to be used to discover the hidden sequence of words in the utterance. Apart from producing the hidden sequence of words in the utterance, the recognizer also outputs a score based on how well the utterance matched the model (i.e., the higher the score, the better the match). In one embodiment of the present text-dependent speaker verification technique, the recognizer is run twice, both times with the same utterance as input, but each run using a different model. On one of the runs the present technique makes use of the speaker-independent model and the model for speaker S is used on the subsequent run. The scores output by the recognizer on these two runs are input to the post-processing module 610. The post processing module is akin to a decision-maker. It essentially gathers all the information that the speech recognizer has to offer and then makes a decision on the claim, i.e., whether this utterance was spoken by a valid user or an imposter. A simple decision-maker is the likelihood ratio test. Boosting is another example of more accurate decision-maker.

Figure 7:
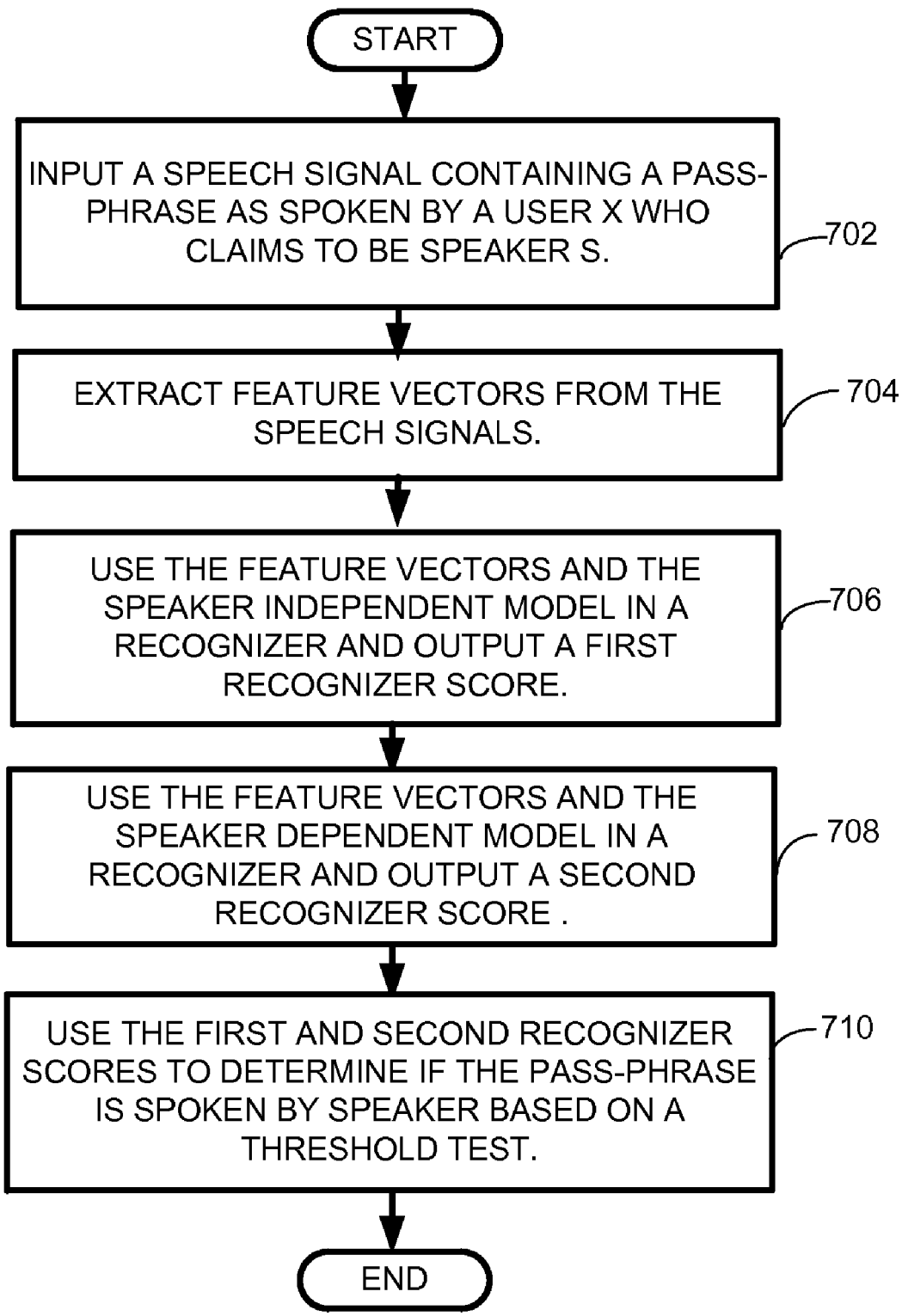
FIG. 7 is a flow diagram depicting one exemplary embodiment of the enrollment process of the present text-dependent speaker verification technique.

In general, the verification process employed in one embodiment of the present text-dependent speaker verification technique is shown in FIG. 7. As shown in block 702, a speech signal containing a pass-phrase spoken by a user X who claims to be Speaker S is input into the system. Feature vectors are extracted from the input speech signal (block 704). The feature vectors and the generic or speaker-independent/background model are then input into a speech recognizer and a first recognizer score is output (block 706). The feature vectors and the speaker-specific model are then input into the speech recognizer and a second recognizer score is output (block 708). The first and second recognizer scores are then used to determine if the pass phrase is spoken by Speaker S (e.g., by using a simple threshold test) (block 710).

In addition to the modes mentioned above, the speech recognizer employed by the present text-dependent speaker verification technique can also be used in a forced alignment mode. In this case, there are two inputs to the recognizer, (a) the utterance spoken by a user and (b) a word sequence. Here the recognizer outputs a score for the word sequence given the utterance, i.e., if the word sequence that matches what was actually said by the user gets a high score, whereas a mismatch yields a low score.

More specifically, described in mathematical terms, in one embodiment, during verification there are two inputs: (a) a claim such as "user X claims to be user S", and (b) the input speech signal containing a pass-phrase as spoken by user X. This problem can be recast as accept/reject the hypothesis, $H_0$: the given speech signal was spoken by user S and contains the user's pass-phrase. Let $O_{1:T}$ be the features vectors extracted from the speech signal. Unless otherwise stated, it is assumed that the user's pass-phrase consists of a sequence of n words, $W=\{w_1, w_2, w_n\}$. The verification step involves the following:

1) The feature vectors $O_{1:T}$ are force aligned with the users pass-phrase W using the speaker independent model $\Lambda$. (Forced alignment determines the time locations of phonemes in an utterance by constraining the automatic speech recognition system to recognize only the input word sequence) The score returned by recognizer in this step is denoted by $p(O_{1:T}|\Lambda, W)$, (equivalent to blocks 702, 704, 706 of FIG. 7)

2) The step above is repeated, but replacing the speaker independent model, $\Lambda$, with the speaker-specific model, $\Lambda^s$, letting the score here be $p(O_{1:T}|\Lambda^s, W)$, (equivalent to blocks 702, 704, 708 of FIG. 7)

3) Finally, $p(O_{1:T}|\Lambda, W)$ and $p(O_{1:T}|\Lambda^s, W)$ are used to either accept or reject the hypothesis (e.g., by a simple thresholding test). (equivalent to block 710 of FIG. 7)

In drawing a parallel with text-independent speaker verification, the speaker independent model ($\Lambda$) plays the same role as the well known universal background model (UBM). A classical approach to hypothesis testing is to compute, $$F = \frac{L(\Lambda^s, W|O_{1:T})}{L(\Lambda, W|O_{1:T})} = \frac{p(O_{1:T}|\Lambda^s, W)}{p(O_{1:T}|\Lambda, W)} \quad (1)$$

where $L(\Lambda^s, W|O_{1:T})$ represents the likelihood of the model $\Lambda^s$ and the word sequence W given the observations. A more familiar form is $f=\log F=\log p(O_{1:T}|\Lambda^s, W)-\log p(O_{1:T}|\Lambda, W)=l(\Lambda^s, W|O_{1:T})-l(\Lambda, W|O_{1:T})$. The hypothesis is then accepted or rejected based on a simple thresholding on F (or f). This is the so-called likelihood ratio test (LRT). Neyman-Pearson lemma suggests that, if both the training and test sets are drawn from the same underlying distribution, then for a given significance level, there is no test more powerful than the LRT.

In practice though, the Neyman-Pearson lemma cannot always be applied. This is because (a) as the amount of training data is only finite, it is not possible to estimate the true underlying distribution that generated the data (training and test), and (b) it is also known that HMM based speech models are approximations of the actual speech process. As a result, one can no longer claim that the LRT is the most powerful hypothesis test.

2.4 Weighted Likelihood Ratio Test and Boosting

The present text-dependent speaker verification technique gives certain classes of words that provide more speaker discriminability than others a larger weight in the verification process in comparison to other classes. In one embodiment this is done by employing a boosting procedure. More particularly, while the discussion in the section above is applicable to LRTs in general, there are some inherent shortcomings of LRT for speaker verification. The final score that is used in the LRT, which is the score at the utterance (sentence) level is a function of the scores at a more sub-utterance level, for example, the state level, or phone level, or syllable level, or even the word level. The recognizer in essence maps these sub-unit scores into a score at the utterance level. Since the recognizer is not necessarily trained to optimize the speaker verification performance, one cannot expect it to learn the optimal mapping (from the speaker verification perspective) of the scores from the sub-unit level to the utterance level. Further, if it is the case that certain classes of words provide more speaker discriminability than others, then these set of words should in essence get a larger weight in the verification process in comparison to other classes. However, in the case of the LRT, all scores are given an equal weight. To illustrate the above point, one can use a simple example: Let $W=\{w_1, w_2, w_n\}$ and that $w_i$ generated $O_{t_{s,i}:t_{e,i}}^{w_i}$ i.e., if one runs forced alignment with W, then let $t_{s,i}$ and $t_{e,i}$ be the start and end of the $i^{th}$ word $w_i$. Thus (if one neglects language model probabilities) one has that, $$f = \log p(O_{1:t}|\Lambda^s) - \log p(O_{1:t}|\Lambda) \quad (2)$$
$$\approx \sum_{i=1}^{n} \log p(O_{t_{s,i}:t_{e,i}}^{w_i}|\Lambda^s) - \sum_{i=1}^{n} \log p(O_{t_{s,i}:t_{e,i}}^{w_i}|\Lambda)$$

It can be seen that every word gets an equal weight. Consider the objective function $$f' \approx \sum_{i=1}^{n} a_i \log p(O_{t_{s,i}:t_{e,i}}^{w_i}|\Lambda^s) - \sum_{i=1}^{n} b_i \log p(O_{t_{s,i}:t_{e,i}}^{w_i}|\Lambda) \quad (3)$$

where the weights $\lambda=\{a_i, b_i\}$, $1 \leq i \leq n$ are learned to optimize overall speaker verification performance. Intuitively, it would make sense to impose the constraint $a_i, b_i \geq 0 \ \forall \ i$. Further, the classical approach is only a special case of the weighted formulation, i.e., f=f', if, $a_i=b_i=1$, all i. The question now is whether one can find a principled way to learn the weights $\lambda$. For this it is useful to consider a small modification of the above, $$f'' \approx \sum_{i=1}^{n} a_i \left[ \log p(O_{t_{s,i}:t_{e,i}}^{w_i}|\Lambda^s) - \log p(O_{t_{s,i}:t_{e,i}}^{w_i}|\Lambda) \right] \quad (4)$$

This has a special significance in the light a popular learning approach. One can think of each of the terms log $p(O_{t_{s,i}:t_{e,i}}^{w_i}|\Lambda^s)$–log $p(O_{t_{s,i}:t_{e,i}}^{w_i}|\Lambda)$ as being a 'weak' classifier, and then the final classification is based on a weighted sum of these weak classifiers. In spirit, this is very similar to the approach of boosting. In boosting a number of weak classifiers are combined to produce a strong classifier. Note that, while in the above discussion a weighted sum is used at the word level, in theory the sum can be formed at other sub-utterance levels, such as state, phone, tri-phone, etc.

Figure 8:
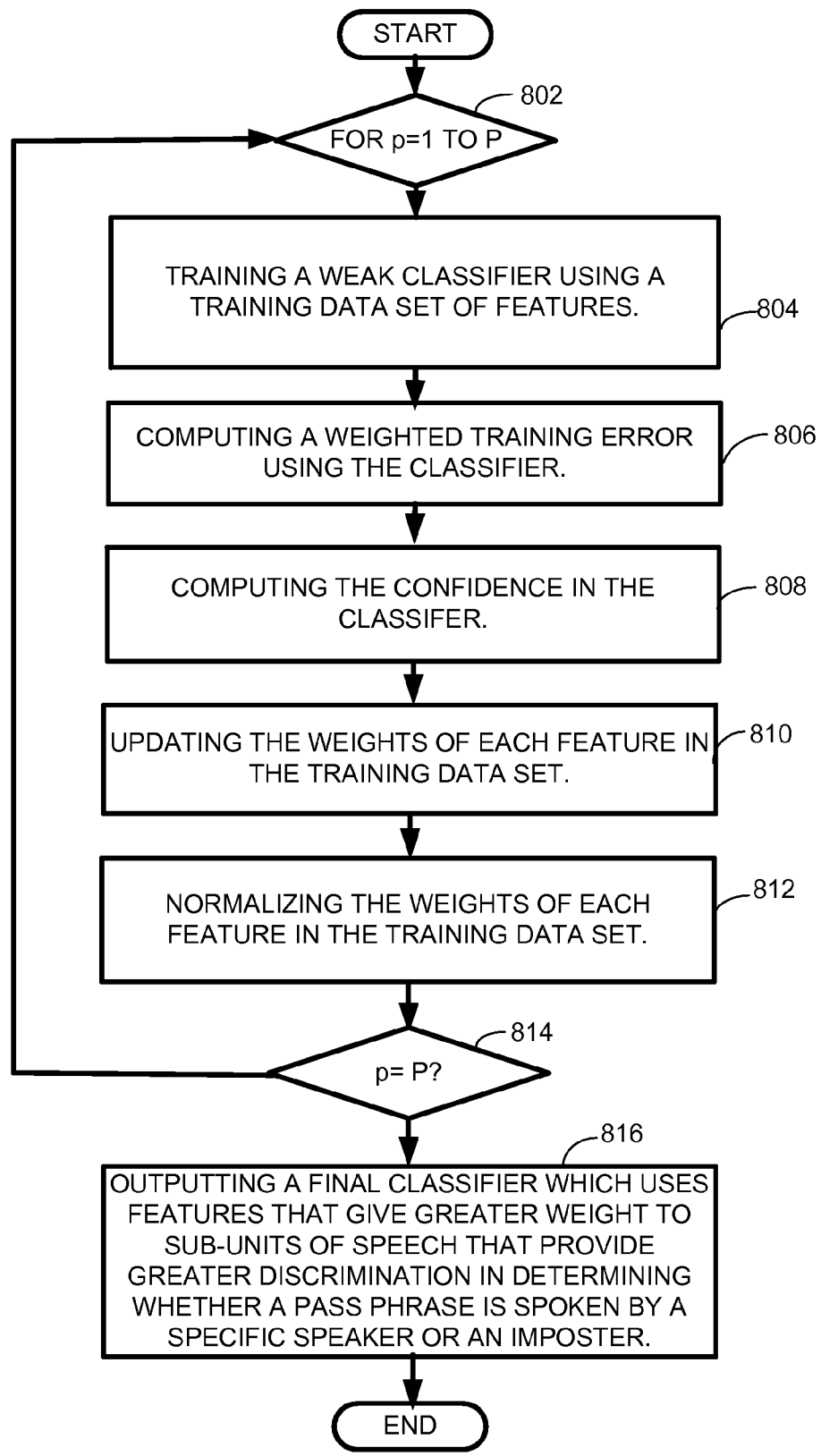
FIG. 8 is a flow diagram depicting a boosting process that can be used by one embodiment of the present text-dependent speaker verification technique in determining whether a speaker is the person they claim to be or an imposter.

Boosting is a technique for sequentially training and combining a collection of classifiers in such a way that the later classifiers make up for the deficiencies of the earlier ones. In boosting each classifier is typically referred to as a weak learner, i.e., each classifier on its own is only capable of producing an output that is slightly better than chance, but when combined with other classifiers to form a powerful classifier. Boosting is used in one embodiment of the present text-dependent speaker verification technique to select the features that best determine when a given speech sample is generated by a given speaker or an imposter. The boosting procedure that is used in one embodiment of the present text-dependent speaker is shown in FIG. 8 and is outlined below.

Given a training set $\{x_i, y_i\}_{i=1}^{N}$, where $x_i$ are the feature vectors derived from the recognizer (i.e. the generative model), and $y_i \in \{0,1\}$ are the labels (see below), initialize $$\{D_i^1\}_{i=1}^N = \frac{1}{N}.$$

Here $D_i$ represents the weight on the $i^{th}$ sample in the training set. Note that if, $x_i$ was generated from a valid speaker, then label $y_i$ is set to 1, whereas if $x_i$ was generated from an imposter then label $y_i$ is set to 0. This embodiment of the present text-dependent speaker verification system then conducts the following iterative process, where p is a counter for iteration.

For iteration p from 1 to P, where P is the prefixed maximum number of iterations (box 802, 814), 1. Train a weak learner based on the weighted training error, and let this classifier be $h_p$ such that $h_p(x_i) \in \{0,1\}$. (box 804)
2. Compute the error in the training set using classifier $h_p$, where the error $\epsilon_p$, is defined as $$\varepsilon_p = \sum_{i=1}^{N} D_i^p |y_i - h_p(x_i)|.$$

(box 806)
3. The confidence, $\alpha_p$, in the above classifier $h_p$ is computed using $$\alpha_p = \frac{1}{2} \ln\left(\frac{1-\varepsilon_p}{1+\varepsilon_p}\right).$$

(box 808)
4. Update the weights of each sample using $D_i^{p+1} = D_i^p e^{-\alpha_p f(y_i, h_p(x_i))}$, where f(m,n) returns +1 when m=n and, −1 otherwise. (box 810)
5. Renormalize the weights of each sample, $$D_i^{p+1} = \frac{D_i^{p+1}}{Z_{p+1}},$$

where the normalization constant $$Z_{p+1} = \sum_{i=1}^{N} D_i^{p+1}.$$

(box 812)
6. Go back to step 1 (i.e. need to repeat steps 1 to 5 P times) (boxes 802 through 814). Output the final classifier which is given by $$H(x) = \sum_{p=1}^{P} \alpha_p h_p(x).$$

This classifier uses the best features to determine whether a speech sample is generated by a given speaker or an imposter (box 816).

The present text-dependent speech recognition technique makes use of decision trees as weak learners. Each node in the tree is essentially a decision stump operating on a single dimension of x (refer to step 1 of the boosting algorithm). In other words, at each iteration, the technique selects one element (dimension) from the feature vector, x, and a corresponding threshold such that it minimizes the weighted training error. Note that the pair (dimension and threshold) are jointly chosen to minimize the weighted error. Intuitively, this is a discriminative feature selection strategy. Thus, in this case, the classifier of a feature, $h_p(x)=I(x^p>K_p)$, where $x^p$ is some element of x that was chosen during the $p^{th}$ iteration, $K_p$ is its corresponding threshold and I is the indicator function, that returns 1 if the condition is true and 0 otherwise. Thus the final decision function is given by $$H(x) = \sum_{p=1}^{P} \alpha_p I(x^p > K_p).$$

Thus, one makes use of boosting to learn the $a_i$ (see equation 4) and an associated threshold in a discriminative fashion.

2.5 Features

In this section the features that are used in one embodiment of the text-dependent speaker verification technique are discussed. As explained previously, given an utterance from speaker S, the text-dependent speaker verification technique makes two passes using the recognizer yielding scores $l(\Lambda^s, W|O_{1:T})$ and $l(\Lambda, W|O_{1:T})$. In addition, the text-dependent speaker verification technique also obtains the word level scores, $l(\Lambda^s, w_i|O_{t_{s,i}:t_{e,i}}^{w_i})$, $l(\Lambda, w_i|O_{t_{s,i}:t_{e,i}}^{w_i})$, $1 \leq i \leq n$. The text-dependent speaker verification technique uses the following features, 1) the raw likelihoods resulting from each recognizer pass at the word and utterance levels.
2) the difference between the raw likelihoods (LR) at the utterance level.
3) the difference between the raw likelihoods (LR) at the word level, and the durations of the words.

One embodiment of the text-dependent speaker verification technique does not use utterance level durations, so the last point in the above only applies to the word level. Further, this embodiment also appends the normalized likelihoods (normalized by number of frames) in all the above cases. The negative of all the likelihoods in the above cases are also added to the feature vector. The reason to add the negative of the likelihoods is because the basic classifier $h_p(x)=I(x^p>K_p)$ uses uni-directional comparisons. The present text-dependent speaker verification technique adds the negative of the features to get a bi-directional comparison. For example, imagine a feature always being less than (say) 0 for some speaker. Then there is no way for a classifier $h_p(x)=I(x^p>K_p)$ to model this phenomena, but then –x is always greater than 0. Intuitively, while some of the features used above might seem to lack the speaker discrimination capabilities, the basic characteristics of boosting allow the text-dependent speaker verification technique to choose as many features as possible, and then let the boosting procedure pick the best features discriminatively.

3.0 Alternate Embodiments

In one embodiment of the present text-dependent speaker verification technique, a user's speech is used as an independent biometric. That is, the pass phrase the user speaks can be different from the password the user normally types in order to get access into a secure system. Actually, in order to gain higher security, the speech pass code is preferred to be different from the typing password. In this case, even when the pass code is overheard by a third party, it cannot be used to gain access to the system by typing.

Additionally, in one embodiment of the present technique, the present text-dependent speaker verification obtains the pass phrase automatically during enrollment. In this embodiment, the present technique does not require the user to submit a pass phrase before enrollment, but uses the output of the speech recognizer instead, thus reducing the user's burden. Since the system does not know the pass phrase in this embodiment, the recognizer may make mistakes. To make the technique more robust, in one embodiment of the present text-dependent speaker verification technique a constrained grammar is used (e.g., the pass phrase only contains 4 digits). This information can be easily obtained at the beginning of enrollment by asking the user to choose an option from a weak pass phrase (4 digits) or a strong pass phrase (8 digits). The present technique makes use of this information to build a constrained grammar for the speech recognizer, thus improving the accuracy of the recognizer.

In many other embodiments, however, the technique provides the option for the user to submit a pass phrase before enrollment.

It should also be noted that any or all of the aforementioned embodiments throughout the description may be used in any combination desired to form additional hybrid embodiments.

Wherefore, what is claimed is:

1. A computer-implemented process for verifying the identity of a speaker, comprising:
using a computing device for:
asking a speaker to repeat a pass phrase;
adapting a trained speaker-independent model to create a speaker-specific model without requiring retraining of the trained speaker-independent model to be used in verifying that the pass phrase is spoken by a specific speaker using a Maximum Likelihood Linear Regression procedure in a text-dependent manner;
inputting a speech signal containing a pass phrase as spoken by a user who claims to be a specific speaker, wherein the speaker was not asked to repeat the pass phrase;
extracting features from the speech signal;
inputting the features and the speaker-independent model into a speech recognizer and outputting a first recognizer score;
inputting the features and the speaker-specific model into a speech recognizer and outputting a second recognizer score; and
using the first and second recognizer scores to determine if the pass phrase is spoken by the specific speaker.

2. The computer-implemented process of claim 1 wherein using the first and second recognizer scores to determine if the pass phrase is spoken by the specific speaker employs a threshold test.

3. The computer-implemented process of claim 1 adapting a speaker-independent model to create a speaker-specific model employs a maximum likelihood procedure.

4. The computer-implemented process of claim 1 wherein certain portions of the input speech signal containing the pass phrase are weighted while using the first and second recognizer scores to determine if the pass phrase is spoken by the specific speaker.

5. The computer-implemented process of claim 1 wherein the recognizer employs hidden Markov Models.

6. The computer-implemented process of claim 1 wherein a boosting procedure is employed to give certain classes of sub-units of speech that provide more discrimination in determining if the pass phrase is spoken by the specific speaker a larger weight in comparison to other classes.

7. The computer-implemented process of claim 6 wherein the sub-units of speech are at least one of:
words;
phonemes; or
tri-phones.

8. The computer-implemented process of claim 6 wherein the boosting procedure comprises:
for a given number of iterations,
training a classifier using a training data set of features;
computing a weighted training error using the classifier;
computing the confidence in the classifier;
updating the weights of each feature in the training data set;
normalizing the weights of each feature in the training data set; and
outputting a final classifier which uses features that give greater weight to classes of sub-units of speech that provide greater discrimination in determining whether a pass phrase is spoken by a specific speaker or an imposter.

9. The computer-implemented process of claim 1 wherein the features are one of:
raw likelihoods resulting from each recognizer pass;
the difference between the raw likelihoods and the durations of employed speech sub-units.

10. The computer-implemented process of claim 1 wherein the pass phrase the user speaks is different from a password a user types in order to verify identity.

11. The computer-implemented process of claim 1 wherein the identity of the speaker is used to gain access to one of:
phone access for banking,
database services,
shopping services,
voice mail, or
access to secure equipment.

12. The computer-implemented process of claim 1 wherein the speaker-specific model is a discriminative model and corrects errors in the speaker-independent model.

13. The computer-implemented process of claim 1 wherein the speaker-independent model employs hidden Markov Models.

14. A computer-readable storage medium having computer-executable instructions permanently stored thereon for performing the process recited in claim 1.

15. A system for verifying the identity of speaker, comprising:
- a general purpose computing device;
- a computer program comprising program modules executable by the general purpose computing device, wherein the computing device is directed by the program modules of the computer program to,
- adapt a speaker-independent model to create a speaker-specific model to be used in verifying the identity of a speaker;
- input a predetermined pass phrase associated with a given speaker;
- input a speech signal containing a pass phrase as spoken by a user who claims to be the specific speaker;
- extract features from the speech signal;
- input the features and the speaker-independent model into a speech recognizer and outputting a first recognizer score;
- input the features and the speaker-specific model into a speech recognizer and outputting a second recognizer score; and
- use the first and second recognizer scores to determine if the pass phrase is the predetermined pass phrase and is spoken by the associated given speaker in a text-dependent manner.

16. The system of claim 15 further comprising a program module to identify the specific speaker.

17. The system of claim 15 wherein a pass phrase is automatically obtained using the speech recognizer prior to inputting a speech signal containing a pass phrase spoken by the user, and wherein the pass phrase automatically obtained is used to determine if the speaker speaking the pass phrase is spoken by the user.

18. The system of claim 17 wherein constrained grammar is used to determine if the pass phrase spoken by the speaker is spoken by the specific speaker.

19. A system for verifying that a speaker who claims to be a specific person is that specific person, comprising:
- a general purpose computing device;
- a computer program comprising program modules executable by the general purpose computing device, wherein the computing device is directed by the program modules of the computer program to,
- input an audio signal of a phrase spoken by a speaker claiming to be a given person into a trained speech recognizer;
- input speaker-independent models into the trained speech recognizer;
- input speaker-specific models of the given person's speech that were derived by adapting the speaker-independent models into the trained speech recognizer using a Maximum Likelihood Linear Regression procedure; and
- use the trained speech recognizer and the input speaker-independent models and the speaker-specific models to determine if the input audio signal of the phrase was spoken by the given person in a text-dependent manner.

* * * * *